US012771019B2

(12) United States Patent
Londhe et al.

(10) Patent No.: US 12,771,019 B2
(45) Date of Patent: Oct. 20, 2026

(54) ANTENNA DEVICE

(71) Applicant: RAMOT AT TEL-AVIV UNIVERSITY LTD, Tel Aviv (IL)

(72) Inventors: Sumeet Londhe, Tel Aviv (IL); Eran Socher, Raanana (IL)

(73) Assignee: RAMOT AT TEL-AVIV UNIVERSITY LTD, Tel Aviv (IL)

(*) Notice: Subject to any disclaimer, the term of this patent is extended or adjusted under 35 U.S.C. 154(b) by 143 days.

(21) Appl. No.: 18/841,973

(22) PCT Filed: Mar. 7, 2023

(86) PCT No.: PCT/IB2023/052149
§ 371 (c)(1),
(2) Date: Aug. 27, 2024

(87) PCT Pub. No.: WO2023/180846
PCT Pub. Date: Sep. 28, 2023

(65) Prior Publication Data

US 2025/0219286 A1 Jul. 3, 2025

(30) Foreign Application Priority Data

Mar. 23, 2022 (GB) .................................... 2204076

(51) Int. Cl.
*H01Q 1/52* (2006.01)
*H01Q 21/08* (2006.01)
*H01Q 23/00* (2006.01)

(52) U.S. Cl.
CPC ............. *H01Q 1/521* (2013.01); *H01Q 21/08* (2013.01); *H01Q 23/00* (2013.01)

(58) Field of Classification Search
CPC .......... G01S 7/03; H01Q 1/521; H01Q 21/08; H01Q 23/00; H01Q 3/36
See application file for complete search history.

(56) References Cited

U.S. PATENT DOCUMENTS 10,062,972 B1 * 8/2018 Strassner, II ......... H01Q 21/065
2004/0090369 A1 * 5/2004 McCarrick ........... H01Q 9/0414
343/700 MS (Continued)

OTHER PUBLICATIONS

International Search Report and Written Opinion for International Application No. PCT/IB2023/052149, mailing date of Jul. 12, 2023.
Boskovic, N., Jokanovic, B., & Markovic, V. (2019). Frequency scanning antenna arrays with metamaterial based phased shifters. Facta Universitatis, Series: Electronics and Energetics, 32(3), 449-461. Nikola Boskovic (Sep. 30, 2019).

(Continued)

*Primary Examiner* — Thien M Le
(74) *Attorney, Agent, or Firm* — Fresh IP PLC; Clifford D. Hyra; Aubrey Y. Chen

(57) ABSTRACT

An antenna device includes a first transformer to output a harmonic component of a fundamental frequency and a leakage component at the fundamental frequency, a first frequency splitter outputting the harmonic component as a first transmission signal and outputting a first leakage signal, a first antenna element configured to radiate the first transmission signal; a second transformer to receive the first leakage signal and output a harmonic component of the fundamental frequency, a second frequency splitter outputting the harmonic component as a second transmission signal, and a second antenna element configured to radiate the second transmission signal. A plurality of transmission signals at harmonic frequencies may be radiated without the use of dividers, thus reducing a DC power consumption of antenna devices. This may increase a total radiated poser for an array area without requiring lenses.

20 Claims, 6 Drawing Sheets

(56) References Cited

U.S. PATENT DOCUMENTS

| | | | | |
|---|---|---|---|---|
| 2005/0090234 | A1* | 4/2005 | Ioku | H04M 3/465 455/412.2 |
| 2005/0096735 | A1* | 5/2005 | Hojeibane | A61F 2/2418 623/2.18 |
| 2010/0245161 | A1 | 9/2010 | Spreadbury | |
| 2012/0306720 | A1* | 12/2012 | Tamai | H01Q 1/50 343/893 |
| 2013/0162496 | A1* | 6/2013 | Wakabayashi | H01Q 1/38 343/893 |
| 2013/0289637 | A1* | 10/2013 | Amely-Velez | A61N 1/3956 607/60 |
| 2020/0041611 | A1 | 2/2020 | Scherz | |
| 2020/0091599 | A1* | 3/2020 | Nakamura | H01Q 1/38 |
| 2022/0311388 | A1* | 9/2022 | Tahara | H04B 1/04 |
| 2023/0030569 | A1* | 2/2023 | Kim | H03H 7/48 |
| 2025/0266854 | A1* | 8/2025 | Takenaka | H04B 1/0483 |

OTHER PUBLICATIONS

Choi, Jun H., Tatsuo Itoh, Z. N. Chen, D. Liu, H. Nakano, X. Qing, and T. Zwick. "Beam-scanning leaky-wave antennas." In Handbook of antenna technologies, pp. 1697-1735. Springer, 2016. Choi, Jun H. (Jan. 1, 2016).

Ranjbar Naeini, Mohammadreza, Mohammad Fakharzadeh, and Forouhar Farzaneh. "Ka-band frequency scanning antenna with wide-angle span." Journal of Infrared, Millimeter, and Terahertz Waves 40 (2019): 231-246. Ranjbar Naeini (Feb. 28, 2019).

Rahman M, NaghshvarianJahromi M, Mirjavadi SS, Hamouda AM. Bandwidth enhancement and frequency scanning array antenna using novel UWB filter integration technique for OFDM UWB radar applications in wireless vital signs monitoring. Sensors. Sep. 19, 2018;18(9):3155. Mahdi Naghshvarian Jahromi (Sep. 19, 2018).

Statutory Invention Registration for Reg. No. US H2028 H, Published Jun. 4, 2002, 8 pages.

* cited by examiner

ANTENNA DEVICE

This application is a National Phase entry of International Application No. PCT/IB2023/052149 under § 371 and claims the benefit of GB Patent Application No. 2204076.0, filed Mar. 23, 2022, which is hereby incorporated by reference in its entirety.

FIELD OF THE DISCLOSURE

The present disclosure relates in general to the field of antenna devices and, in particular, to a device for radiating a plurality of transmission signals at a harmonic frequency of an input signal.

BACKGROUND

To generate N radiating channels using traditional architecture N-1 dividers will be required. These dividers typically have a large footprint and high DC power consumption.

In addition, up-converting the frequency of an input signal can improve the angular resolution of a beam and also lower the antenna area, lowering the form factor. For example, 77-81 GHz multi-channel transmitters/receivers (Tx/Rx) are commercially available in the market for automotive and communication use, which can be up-converted using nonlinear circuits like mixers/triplers/doublers. For example, the signal can be up-converted to 231-243 GHz using a tripler.

Such non-linear elements further increase DC power consumption as each divided channel will require an amplification stage for the non-linear circuits to function.

It would be beneficial to lower the DC power consumption of an array, thus improving efficiency of a chip comprising one or more arrays.

SUMMARY

According to a first aspect of the present disclosure, there is provided an antenna device comprising: a first transformer configured to receive a first input signal at a fundamental frequency and to generate a first transformer output comprising a harmonic component of the fundamental frequency and a leakage component at the fundamental frequency; a first frequency splitter comprising an input port to receive the first transformer output, a first output port to output the harmonic component of the first transformer output as a first transmission signal, and a second output port to output the leakage component of the first transformer output as a first leakage signal; a first antenna element configured to radiate, in use, the first transmission signal; a second transformer configured to receive the first leakage signal and to generate a second transformer output comprising a harmonic component of the fundamental frequency and a leakage component at the fundamental frequency; a second frequency splitter comprising an input port to receive the second transformer output, and a first output port to output the harmonic component of the second transformer output as a second transmission signal; and a second antenna element configured to radiate, in use, the second transmission signal. In this way, a plurality of transmission signals at one or more harmonic frequencies may be radiated, in use, without the use of dividers, thus reducing a DC power consumption of antenna devices described herein. Additionally or alternatively, a DC power consumption of the antenna devices described herein may be further reduced by using lower amplifying stages, further improving efficiency of the circuit, particularly when implemented on-chip. Additionally or alternatively, this may reduce a form factor area of the antenna device when implemented with transistors, such as when implemented on a chip. Additionally or alternatively, this may increase a total radiated poser (TRP) for an array area without requiring one or more lenses.

According to a further aspect of the present disclosure, there is provided an antenna device, wherein the second frequency splitter comprises a second output port to output the leakage component of the second transformer output as a second output leakage signal. This may be advantageous when an antenna device is used in a chain and/or array.

According to a further aspect of the present disclosure, there is provided an antenna device further comprising: one or more additional transformers each configured to receive a leakage signal from a preceding frequency splitter as an additional input signal at an additional fundamental frequency and to generate an additional transformer output comprising a harmonic component of the additional fundamental frequency and a leakage component at the additional fundamental frequency; and an additional frequency splitter for each additional transformer, comprising an input port to receive the additional transformer output and a first output port to output the harmonic component of the additional transformer output as an additional transmission signal. Optionally, the additional frequency splitter comprises a second output port to output the leakage component of the additional transformer output as an output leakage signal for a subsequent transformer. This may be advantageous when an antenna device is used in a chain and/or array.

According to a further aspect of the present disclosure, one or more harmonic components comprise a tripled component at a third harmonic of the fundamental frequency. This may advantageously provide sub-terahertz frequency bands with higher available bandwidths and smaller form factors. For example, using an antenna device disclosed herein, an existing transceiver for automotive radars covering at least 75-83 GHz may be extended to a radar operation 225-250 GHz with a reduced antenna array size and increased spatial resolution.

According to a further aspect of the present disclosure, a plurality of antenna elements are arranged in a chain and/or an array. For example, an antenna array and/or antenna chain is provided comprising a plurality of antenna devices. These may advantageously provide providing a more efficient radiation of power from a smaller form factor. Additionally or alternatively, this may advantageously provide beam steering by varying the phase states between antenna elements.

According to a further aspect of the present disclosure, one or more antenna elements are arranged as one or more on-chip antenna elements. Additionally or alternatively, one or more antenna elements are arranged to excite at least a portion of a substrate. Additionally or alternatively, one or more antenna elements are arranged as one or more a dielectric resonance antennas. These may allow more antenna elements to be provided within a predetermined die area to further lower beam widths and/or to further improve beam steering, while increasing radiated power density.

According to a further aspect of the present disclosure, there is provided a method of signal transmission comprising: receiving a first input signal at a fundamental frequency; generating a first transformer output comprising a harmonic of the fundamental frequency and a leakage component at the fundamental frequency; receiving the first transformer output at an input port of a first frequency splitter; outputting the harmonic of the first transformer output as a first transmission signal from a first output port of the first frequency splitter; outputting the leakage component of the first transformer output as a first leakage signal from a second output port of the first frequency splitter; generating a second transformer output comprising a harmonic component of the fundamental frequency and a leakage component at the fundamental frequency; receiving the second transformer output at an input port of a second frequency splitter; outputting the harmonic of the second transformer output as a second transmission signal from a first output port of the second frequency splitter; and radiating each of the transmission signal from a respective antenna element.

According to a further aspect of the present disclosure, there is provided a method further comprising: receiving, by one or more additional transformers, the leakage signal from a preceding frequency splitter as an additional input signal at an additional fundamental frequency and generating an additional transformer output comprising a harmonic component of the additional fundamental frequency and a leakage component at the additional fundamental frequency; receiving the additional transformer output at an input port of an additional frequency splitter; and outputting the harmonic component of the additional transformer output as an additional transmission signal from a first output port of the additional frequency splitter.

According to a further aspect of the present disclosure, there is provided a method comprising: outputting the leakage component of the additional transformer output as an additional leakage signal from a second output port of the additional frequency splitter.

According to a further aspect of the present disclosure, there is provided a method, wherein one or more harmonic components comprise a tripled component at a third harmonic of the fundamental frequency.

According to a further aspect of the present disclosure, there is provided a method comprising exciting at least a portion of a substrate using one or more antenna elements.

According to a further aspect of the present disclosure, there is provided a method comprising, wherein the method further comprises resonating at least a portion of a dielectric using one or more antenna elements.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which are provided for a better understanding of the present disclosure and to show more clearly how the present disclosure may be carried into effect. Reference will now be made by way of example only, to the accompanying drawings, in which.

DETAILED DESCRIPTION

In the following detailed description, numerous non-limiting specific details are given to assist in understanding this disclosure. It will be obvious to a person skilled in the art that any software methods may be implemented on any type of suitable controllers, memory elements, and/or computer processors.

Figure 1:
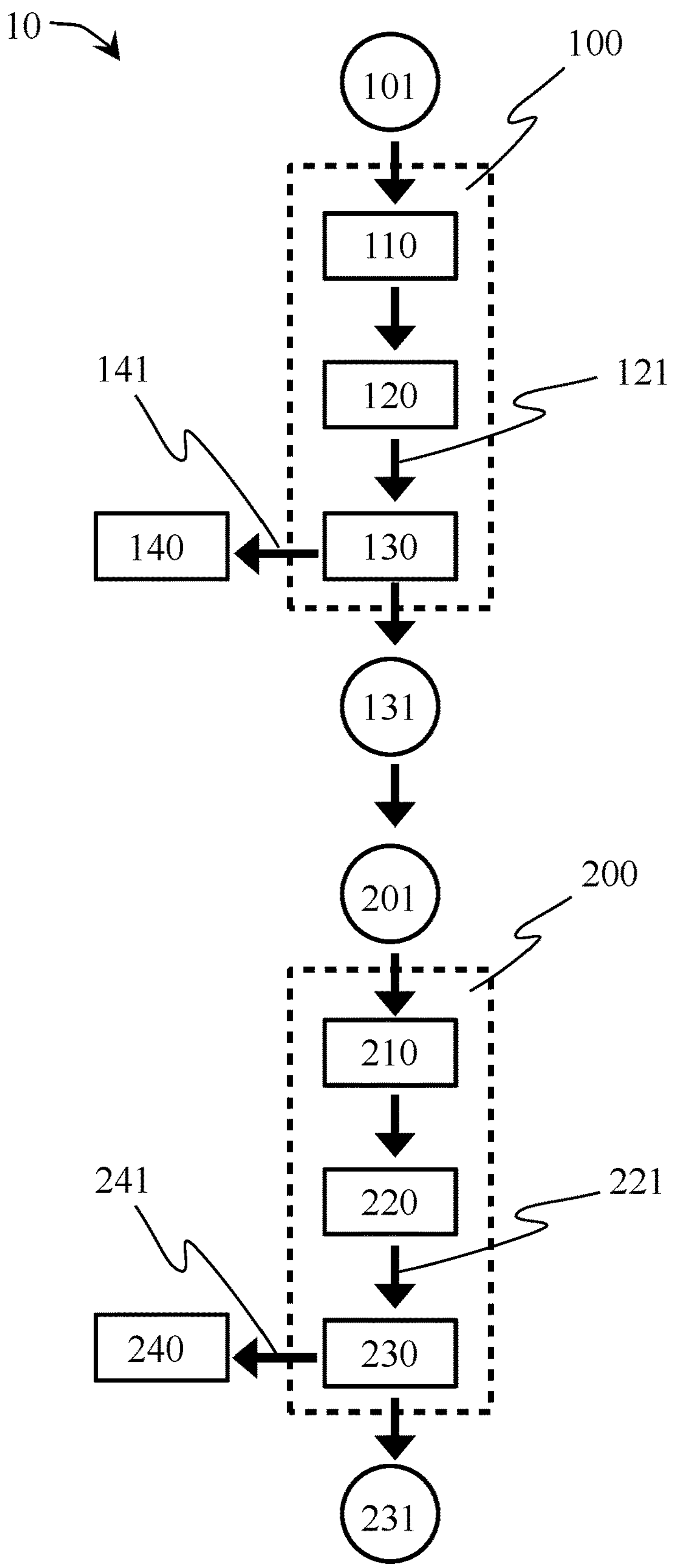
FIG. 1 is schematic diagram of an antenna device according to an embodiment.

FIG. 1 of the accompanying drawings shows a schematic diagram of a first antenna device 10 (a first embodiment of an antenna device). The first antenna device 10 comprises a plurality of antenna elements 140, 240, wherein each antenna element 140, 240 is arranged to receive transmission signals from respective transmission signal sources 100, 200. More specifically, a first antenna element 140 is arranged to receive transmission signals from a first transmission signal source 100, and a second antenna element 240 is arranged to receive transmission signals from a second transmission signal source 200. The first transmission signal source 100 and the second transmission signal source 200 are schematically depicted as separate functional units with separate functional elements. However, this does not require that the units are physically separated when implemented-one or more of the functional elements within a functional unit may be integrated in the same component and/or share components. Additionally or alternatively, one or more of the functional elements from one or more functional units may be integrated in the same component and/or share components.

In general, the antenna devices disclosed herein may be arranged to provide an array of antenna elements, whereby a group of antenna elements are arranged as a complete unit, providing a more efficient radiation of power from a smaller form factor. Additionally or alternatively, beam steering may be provided by varying the phase states between antenna elements. Optionally, an array may comprise a plurality of antenna elements arranged in rows and/or columns. A 1D-array or chain (or daisy-chain) of two or more antenna elements may be arranged as a 1×2, 1×3, 1×4, 2×1, 3×1, 4×1, etc. array of antenna elements. A 2D-array of two or more antenna elements may be arranged as a 2×2, 2×3, 2×4, 3×2, 3×3, 3×4, 4×2, 4×3, 4×4 etc. array of antenna elements.

As depicted in the example of FIG. 1, the first antenna device 10 may be implemented as a chain or 1D-array of two or more antenna elements. Alternatively, a plurality of first antenna devices 10 may be implemented as a chain, 1D-array or 2D-array of antenna elements. The first antenna device 10 may be implemented as an on-chip chain and/or an on-chip array of antenna elements. In the example depicted in FIG. 1, the first antenna device 10 comprises two antenna elements 140, 240 in a 1×2 or 2×1 array.

The first transmission signal source 100 comprises a first transformer 120 and a first frequency splitter (or diplexer) 130. The first transformer 120 is configured to receive the first input signal 101 at a first fundamental frequency w1 by providing, for example, a first input stage 110. For example, the first fundamental frequency w1 of the first input signal 101 may be in the range of 75 to 83 GHZ. As depicted in FIG. 1, the first transmission signal source 100 may comprise a separate first input stage 110, configured to receive the first input signal 101 and to provide a suitable signal at the first fundamental frequency w1 to the first transformer 120. Alternatively, a suitable input stage may be comprised in the first transformer 120.

The first transformer 120 is configured to generate a first transformer output 121. The first transformer output 121 comprises a harmonic component of the first fundamental frequency w1 and a leakage component at the first fundamental frequency w1. In some examples, the harmonic component may be a tripled component at a third harmonic of the first fundamental frequency w1. For example, if the first fundamental frequency w1 is in the range of 75 to 83 GHZ, the tripled component at a third harmonic is in the range of 225 to 250 GHz. For example, if the first fundamental frequency w1 is in the range of 75 to 84 GHZ, the tripled component at a third harmonic is in the range of 225 to 252 GHz. For example, if the first fundamental frequency w1 is in the range of 77 to 81 GHz, the tripled component at a third harmonic is in the range of 231 to 243 GHz. For example, if the first fundamental frequency w1 is approximately 80 GHz, the tripled component at a third harmonic is approximately 240 GHz. This may advantageously provide sub-terahertz frequency bands with higher available bandwidths and smaller form factors. For example, using an antenna device disclosed herein, an existing transceiver for automotive radars covering at least 75-83 GHz may be extended to a radar operation 225-250 GHz with a reduced antenna array size and increased spatial resolution.

Alternatively, the harmonic component may be a doubled component or any other harmonic of the first fundamental frequency w1. For example, if the first fundamental frequency w1 is in the range of 75 to 83 GHZ, the doubled component at a second harmonic is in the range of 150 to 166 GHz. For example, if the first fundamental frequency w1 is in the range of 75 to 84 GHz, the doubled component at a second harmonic is in the range of 150 to 168 GHz. For example, if the first fundamental frequency w1 is in the range of 77 to 81 GHZ, the doubled component at a second harmonic is in the range of 154 to 162 GHz. For example, if the first fundamental frequency w1 is approximately 80 GHz, the doubled component at a second harmonic is approximately 160 GHz. This may advantageously provide sub-terahertz frequency bands with higher available bandwidths and smaller form factors. For example, using an antenna device disclosed herein, an existing transceiver for automotive radars covering at least 75-83 GHz may be extended to a radar operation 150-166 GHz with a reduced antenna array size and increased spatial resolution.

The first frequency splitter 130 comprises an input port, a first output port and a second output. The input port is configured to receive the first transformer output 121. The first output port is configured to output the harmonic component of the first transformer output 121 as a first transmission signal 141. The first antenna element 140 is configured to receive the first transmission signal 141, and, in use, to radiate the first transmission signal 141. Optionally, one or more first signal couplers (not depicted) may be provided for outputting the first transmission signal 141 to the first antenna element 140. The second output port is configured to output the leakage component of the first transformer output 121 as a first leakage signal 131 at the first fundamental frequency w1. Optionally, one or more first signal couplers (not depicted) may be provided for outputting the first leakage signal 131 to the second transmission signal source 200.

In general, the second transmission signal source 200 comprises a second transformer 220 and a second frequency splitter (or diplexer) 230. The second transformer 220 is configured to receive a second input signal 201 at a second fundamental frequency w2 by providing, for example, a second input stage 210. For example, the second fundamental frequency w2 may be in the range of 75 to 83 GHZ. As depicted in FIG. 1, the second transmission signal source 200 may comprise a separate second input stage 210, configured to receive the second input signal 201 and to provide a suitable signal at the second fundamental frequency w2 to the second transformer 220. Alternatively, an input stage may be comprised in the second transformer 220. In general, the second transformer 220 is configured to generate a second transformer output 221. The second transformer output 221 comprises a harmonic component of the second fundamental frequency and a leakage component at the second fundamental frequency. In some examples, the harmonic component may be a tripled component at a third harmonic of the second fundamental frequency. Alternatively, the harmonic component may be a doubled component or any other harmonic of the second fundamental frequency. In general, the second frequency splitter 230 comprises an input port and a first output port. The input port is configured to receive the second transformer output 221. The first output port is configured to output the harmonic component of the second transformer output 221 as a second transmission signal 241. Optionally, the second frequency splitter 230 comprises a second output, configured to output the leakage component of the second transformer output 221 as a second leakage signal 231. In general, the second antenna element 240 is configured to receive the second transmission signal 241, and, in use, to radiate the second transmission signal 241. In general, the second transmission signal source 200 may be identically, similarly or differently configured to the first transmission signal source 100. Optionally, one or more second signal couplers (not depicted) may be provided for outputting a second leakage signal 231 and/or the second transmission signal 241.

In the example depicted in FIG. 1, the first transmission signal source 100 outputs the leakage component of the first transformer output 121 as the first leakage signal 131 at the first fundamental frequency w1. In the example depicted in FIG. 1, the second transformer 220 is configured to receive the first leakage signal 131 at the first fundamental frequency w1 of the first input signal 101. The second transformer 220 is configured to generate a second transformer output 221 comprising a harmonic component of the first fundamental frequency w1 of the first input signal 101 and a leakage component at the first fundamental frequency w1 of the first input signal 101. The first output port of the second frequency splitter 230 is configured to output the harmonic component of the second transformer output 221 as a second transmission signal 241. The second antenna element 240 is configured to receive the second transmission signal 241, and, in use, to radiate the second transmission signal 241. Optionally, one or more second signal couplers (not depicted) may be provided for outputting the second transmission signal 241 to the second antenna element 240.

Optionally, as depicted in the example of FIG. 1, the second output of the second frequency splitter 230 may be configured to output the leakage component of the second transformer output 121 as a second leakage signal 231. In the example depicted in FIG. 1, the leakage component of the second leakage signal 231 is at the first fundamental frequency w1 of the first input signal 101. Optionally, one or more second signal couplers (not depicted) may be provided for outputting the second leakage signal 231 to a further transmission signal source (not depicted). This may be advantageous when the antenna device 10 is used in a chain and/or an array.

The leakage component of the first fundamental signal w1 from the harmonic generating circuit is used as an input to the next transmission signal source in the chain. In this way, a plurality of transmission signals 141, 241 at one or more harmonic frequencies may be radiated, in use, without the use of dividers, thus reducing a DC power consumption of antenna devices described herein. In addition, a DC power consumption of the antenna devices described herein may be further reduced by using lower amplifying stages, further improving efficiency of the circuit, particularly when implemented on-chip.

In some examples, the transmission signals may be harmonics, i.e. an integer multiple, of the fundamental frequency in the range of 75 to 83 GHZ. For example, each transmission signal may be a third harmonic in the range of 225 to 250 GHz. When being implemented, for example, the first transformer 120 and the second transformer 220 may use the non-linearity of NMOS to generate one or more harmonic components, such as one or more third harmonic components.

In general, the antenna devices described herein may comprise a respective driving stage for one or more transformers 120, 220. A driving stage may be configured to amplify an input of the one or more transformers 120, 220. Optionally, a driving stage may be comprised in a transformer 120, 220 or comprised in an optional input stage 110, 120. Optionally, a gate voltage of one or more driving stages may be controlled to generate a phase adjustment at an input of the one or more transformers 120, 220.

Figure 3A:
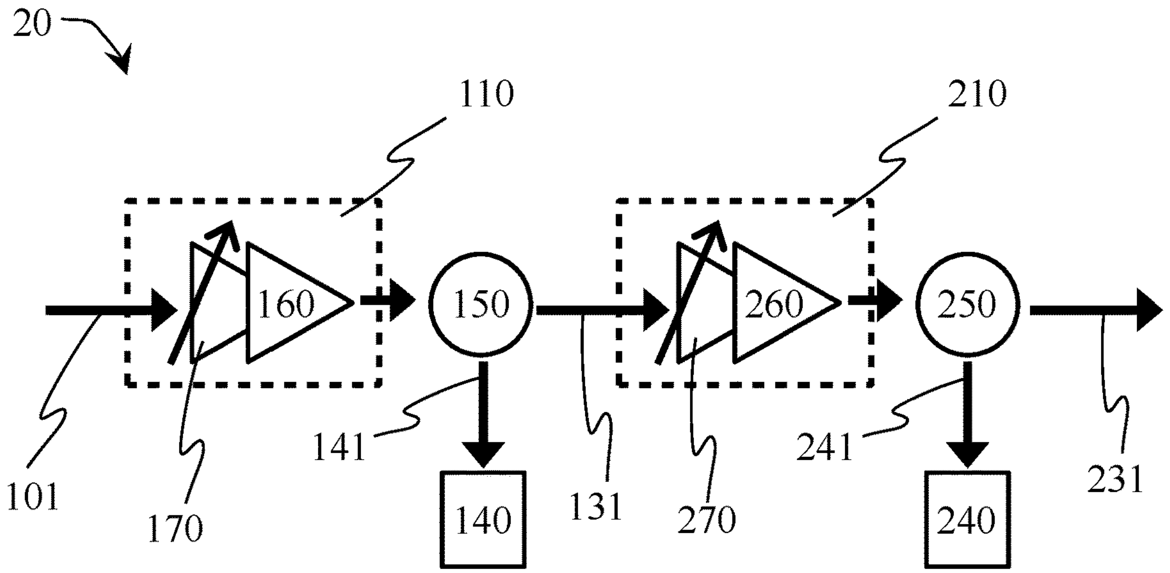
FIG. 3*a* is a schematic diagram showing an antenna device according to an embodiment.

FIG. 3*a* shows a block diagram of an example embodiment suitable for implementing the first antenna device 10 described with respect to FIG. 1. As depicted in the example of FIG. 3*a*, a second antenna device 20 (a second embodiment of an antenna device) is provided comprising a plurality of antenna elements 140, 240, wherein a first antenna element 140 is arranged to receive transmission signals from a first tripler 150, and a second antenna element 240 is arranged to receive transmission signals from a second tripler 250. As depicted in the example of FIG. 3*a*, the second antenna device 20 may be implemented as a chain or 1D-array of two or more antenna elements. Alternatively, a plurality of second antenna devices 20 may be implemented as a chain, 1D-array or 2D-array of antenna elements. The second antenna device 20 may be implemented as an on-chip chain and/or an on-chip array of antenna elements. In the example depicted in FIG. 3*a*, the second antenna device 20 comprises two antenna elements 140, 240 in a 1×2 or 2×1 array.

The first tripler 150 comprises a first transformer (not depicted in FIG. 3*a*) and a first frequency splitter (not depicted in FIG. 3*a*). The first tripler 150 further comprises an input port (not depicted), a first output port (not depicted) and a second output (not depicted). The first tripler 150 is configured to receive the first input signal 101 at a first fundamental frequency w1 on the input port by providing, for example, a first input stage 110. As depicted in FIG. 3*a*, the second antenna device 20 may comprise a separate first input stage 110. Alternatively, the first input stage may be comprised in the first tripler 150. The first input stage 110 is configured to receive the first input signal 101 and to provide a suitable signal at the first fundamental frequency w1 to the first tripler 150.

In the example depicted in FIG. 3*a*, the first input stage 110 may comprise an optional first driving stage 160 for the first tripler 150, configured to amplify the first input signal 101 for the input of the first tripler 150. Optionally, the optional power amplification may be biased at class AB operation to improve efficiency. In the example depicted in FIG. 3*a*, an optional first phase adjustment 170 may be provided to allow the phase of the first input signal 101 to be adjusted for the input of the first tripler 150. For example, a gate voltage of the optional first driving stage 160 may be controlled to generate a suitable phase adjustment. This biasing control may be used to phase shift the signal at the first fundamental frequency w1 between harmonic generating elements, thereby increasing the phase difference at the first antenna element 141. In the example depicted in FIG. 3, the first harmonic generating element is a tripler, thereby tripling the phase difference at the first antenna element 141. In other words, a phase change φ at the first fundamental frequency w1 will also be tripled to 3φ in the third harmonic component 3*w*1.

The first output port of the first tripler 150 is configured to output a third harmonic component of the first fundamental frequency w1 as a first transmission signal 141. For example, the first fundamental frequency w1 may be in the range of 75 to 83 GHz. and the tripled component at a third harmonic may be in the range of 225 to 250 GHz. The first antenna element 140 is configured to receive the first transmission signal 141, and, in use, to radiate the first transmission signal 141. Optionally, one or more first signal couplers (not depicted) may be provided for outputting the first transmission signal 141 to the first antenna element 140. The second output port of the first tripler 150 is configured to output a leakage component at the first fundamental frequency w1 as a first leakage signal 131. Optionally, one or more first signal couplers (not depicted) may be provided for outputting the first leakage signal 131 to the second transmission signal source and the second tripler 250.

The second tripler 250 comprises a second transformer (not depicted in FIG. 3*a*) and a second frequency splitter (not depicted in FIG. 3*a*). The second tripler 250 further comprises an input port (not depicted) and a first output port (not depicted). In the example depicted in FIG. 3*a*, the second tripler 250 is configured to receive the first leakage signal 131 at the first fundamental frequency w1 from the first tripler 150. The input port may be configured by providing, for example, a second input stage 210. As depicted in FIG. 3*a*, the second antenna device 20 may comprise a separate second input stage 210. Alternatively, the second input stage may be comprised in the second tripler 250. The second input stage 210 is configured to receive the first leakage signal 131 and to provide a suitable signal at the first fundamental frequency w1 to the second tripler 250.

In the example depicted in FIG. 3*a*, the second input stage 210 may comprise an optional second driving stage 260 for the second tripler 250, configured to amplify the first leakage signal 131 for the input of the second tripler 250. Optionally, the optional power amplification may be biased at class AB operation to improve efficiency. In the example depicted in FIG. 3*a*, an optional second phase adjustment 270 may be provided to allow the phase of the first leakage signal 131 to be adjusted for the input of the second tripler 250. For example, a gate voltage of the optional second driving stage 260 may be controlled to generate a suitable phase adjustment.

The first output port of the second tripler 250 is configured to output a third harmonic component of the first fundamental frequency w1 as a second transmission signal 241. In the example depicted in FIG. 3, the second harmonic generating element is a tripler, thereby tripling the phase difference at the second antenna element 241. In other words, a phase change φ at the first fundamental frequency w1 will also be tripled to 3φ in the third harmonic component 3*w*1. For example, the first fundamental frequency w1 may be in the range of 75 to 83 GHZ. and the tripled component at a third harmonic may be in the range of 225 to 250 GHz. The second antenna element 240 is configured to receive the second transmission signal 241, and, in use, to radiate the second transmission signal 241. Optionally, one or more second signal couplers (not depicted) may be provided for outputting the second transmission signal 241 to the second antenna element 240.

In the example depicted in FIG. 3*a*, the second tripler 250 optionally comprises a second output (not depicted), configured to output a leakage component at the first fundamental frequency w1 as a second leakage signal 231. In the example depicted in FIG. 3*a*, the leakage component of the second leakage signal 231 is at the first fundamental frequency w1 of the first input signal 101. Optionally, one or more second signal couplers (not depicted) may be provided for outputting the second leakage signal 231 to a further transmission signal source (not depicted) with a further tripler (not depicted). This may be advantageous when the antenna device 10 is used in a chain and/or an array.

Figure 2:
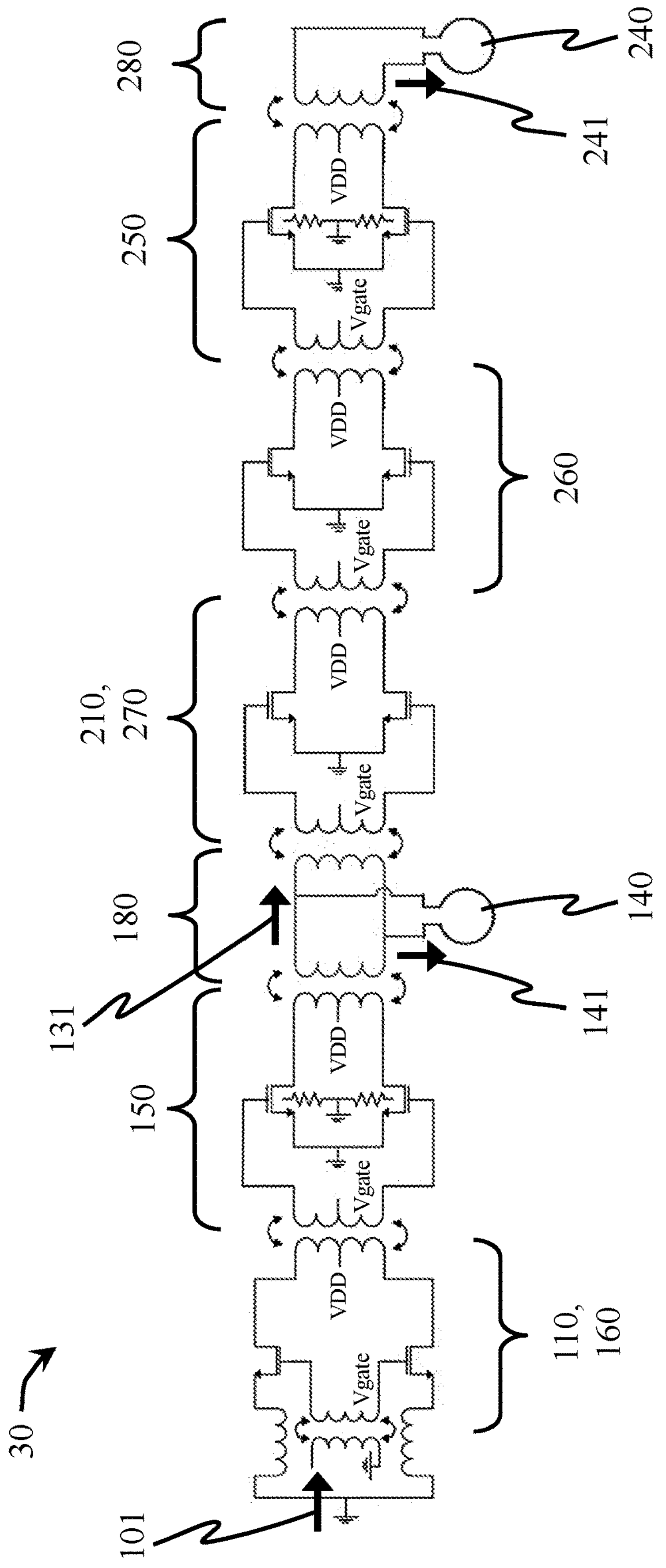
FIG. 2 is a circuit diagram of an antenna device according to an embodiment.

FIG. 2 shows a circuit diagram of an example embodiment suitable for implementing the first antenna device 10 described with respect to FIG. 1. As depicted in the example of FIG. 2, a third antenna device 30 (the third embodiment of an antenna device) is provided, comprising a plurality of antenna elements 140, 240, wherein a first antenna element 140 is arranged to receive transmission signals from a first tripler 150, and a second antenna element 240 is arranged to receive transmission signals from a second tripler 250. As depicted in the example of FIG. 2, the third antenna device 30 may be implemented as a chain or 1D-array of two or more antenna elements. Alternatively, a plurality of third antenna devices 30 may be implemented as a chain, 1D-array or 2D-array of antenna elements. The third antenna device 30 may be implemented as an on-chip chain and/or on-chip array of antenna elements. In the example depicted in FIG. 2, the third antenna device 30 comprises two antenna elements 140, 240 in a 1×2 or 2×1 array.

The first tripler 150 comprises a first transformer and a first frequency splitter. The first tripler 150 further comprises an input port, a first output port and a second output. The first tripler 150 is configured to receive the first input signal 101 at a first fundamental frequency w1 on the input port by providing, for example, a first input stage 110. As depicted in FIG. 2, the third antenna device 30 may comprise a separate first input stage 110. Alternatively, the first input stage may be comprised in the first tripler 150. The first input stage 110 is configured to receive the first input signal 101 and to provide a suitable signal at the first fundamental frequency w1 to the first tripler 150.

In the example depicted in FIG. 2, the first input stage 110 may comprise an optional first driving stage 160 for the first tripler 150, configured to amplify the first input signal 101 for the input of the first tripler 150. Optionally, the optional power amplification may be biased at class AB operation to improve efficiency. An optional first phase adjustment (not depicted) may be provided to allow the phase of the first input signal 101 to be adjusted for the input of the first tripler 150. For example, a gate voltage of the optional first driving stage 160 may be controlled to generate a suitable phase adjustment (not depicted). This biasing control may be used to phase shift the signal at the first fundamental frequency w1 between harmonic generating elements, thereby increasing the phase difference at the first antenna element 141. In the example depicted in FIG. 2, the first harmonic generating element is a tripler, thereby tripling the phase difference at the first antenna element 141. In other words, a phase change φ at the first fundamental frequency w1 will also be tripled to 3φ in the third harmonic component 3*w*1.

The first driving stage 160 may be designed as a single common source stage. The input of the first driving stage 160 may be inductively degenerated to improve input matching to 50Ω and stability of the first driving stage 160. The first driving stage 160 may be configured to amplify an input of the first tripler 150.

In some examples, the first driving stage 160 may be used as variable gain amplifier by tuning its gate voltage. The change in gate voltage at the first driving stage 160 may change the gate capacitance. At saturation, the change in the gate voltage may vary the phase at the first fundamental frequency w1 without a major change in voltage swing at gates of the first tripler 150. Such a voltage-controlled phase change may also change the output power in the third harmonic component 3*w*1.

In some examples, the power amplification of the first driver stage 160 may be optimized to deliver a high voltage swing at the gates of the first tripler 150. When being implemented. sizing of the first driver stage 160 may depend to a high degree upon output power requirements at the first fundamental frequency w1. For example, transistors comprised in the first driver stage 160 may be sized with "25×600 nm×3"—in other words, 3 transistors with 25 fingers of 600 nm width each.

The first output port of the first tripler 150 is configured to output a third harmonic component of the first fundamental frequency w1 as a first transmission signal 141. For example, the first fundamental frequency w1 may be in the range of 75 to 83 GHz. and the tripled component at a third harmonic may be in the range of 225 to 250 GHz. The first antenna element 140 is configured to receive the first transmission signal 141, and, in use, to radiate the first transmission signal 141. Optionally, one or more first signal couplers 180 may be provided for outputting the first transmission signal 141 to the first antenna element 140. The second output port of the first tripler 150 is configured to output a leakage component at the first fundamental frequency w1 as a first leakage signal 131.

Optionally, one or more first signal couplers 180 may be provided for outputting the first leakage signal 131 to a second transmission signal source and a second tripler 250. The fundamental harmonic current generated by the first tripler 150 may be coupled to the second transmission signal source using a fundamental bandpass transformer. The fundamental frequency harmonic transformer typically serves two functions: to block 3*w*1 harmonic current leak to a next driving stage of the second transmission signal source, and to match the gates of driving stage for a high voltage swing.

When being implemented, sizing of the first tripler 150 may depend to a high degree upon maximizing output power at the harmonic 3*w*1 to the one or more first signal couplers 180, such as to a matching balun. For example, the transistors comprised in the first tripler 150 may be sized with "10×700 nm×2"—in other words, with 2 transistors with 10 fingers of 700 nm each. For example, the input portion of the one or more first signal couplers 180, such as a matching balun, may be designed to maximize the fundamental frequency harmonic voltage at the gates of one or more transformers, while showing the optimum load to the power amplification of the second driving stage 260. For example, at saturation during use, a voltage swing of 2.5 Vpp may be delivered at one or more gates of one or more transformers. For example, when implemented, the transformers together may consume a total DC current of 55 mA at 0.9V.

The second tripler 250 comprises a second transformer and a second frequency splitter. The second tripler 250 further comprises an input port (not depicted) and a first output port (not depicted). In the example depicted in FIG. 2, the second tripler 250 is configured to receive the first leakage signal 131 at the first fundamental frequency w1 from the first tripler 150. The input port may be configured by providing, for example, a second input stage 210. As depicted in FIG. 2, the second antenna device 20 may comprise a separate second input stage 210. Alternatively, the second input stage may be comprised in the second tripler 250. The second input stage 210 is configured to receive the first leakage signal 131 and to provide a suitable signal at the first fundamental frequency w1 to the second tripler 250. For example, when being implemented, the transistors comprised in the second tripler 250 may be sized with "10×700 nm×2"—in other words, with 2 transistors with 10 fingers of 700 nm width each.

In the example depicted in FIG. 2, the second input stage 210 may comprise an optional second driving stage 260 for the second tripler 250, configured to amplify the first leakage signal 131 for the input of the second tripler 250. Optionally, the optional power amplification may be biased at class AB operation to improve efficiency. In the example depicted in FIG. 2, an optional second phase adjustment 270 may be provided to allow the phase of the first leakage signal 131 to be adjusted for the input of the second tripler 250. For example, a gate voltage of the optional second driving stage 260 may be controlled to generate a suitable phase adjustment. When being implemented, sizing of the second input stage 210 may depend to a high degree upon output power requirements at the first fundamental frequency w1. For example, transistors comprised in the second input stage 210 may be sized with "15×600 nm×3"—in other words, with 3 transistors with 15 fingers of 600 nm width each. For example, transistors comprised in the second driving stage 260 may be sized with "20×600 nm×3"—in other words, with 3 transistors with 20 fingers of 600 nm width each.

The second driving stage 260 may be designed as a single common source stage. The input of the second driving stage 260 may be inductively degenerated to improve input matching to 50Ω and stability of the second driving stage 260. The second driving stage 260 may be configured to amplify an input of the second tripler 150. For example, when matched to 50Ω, the power amplification of the second driving stage 260 may deliver up to 10 dBm Psat at 78 GHz. The power amplification of the second driving stage 260 may typically consume an approximate total DC current of 108 mA at 0.9 VDD.

The first output port of the second tripler 250 is configured to output a third harmonic component of the first fundamental frequency w1 as a second transmission signal 241. In the example depicted in FIG. 2, the second harmonic generating element is a tripler, thereby tripling the phase difference at the second antenna element 241. In other words, a phase change φ at the first fundamental frequency w1 will also be tripled to 3φ in the third harmonic component **3*w*1. For example, the first fundamental frequency w1 may be in the range of 75 to 83 GHZ. and the tripled component at a third harmonic may be in the range of 225 to 250 GHz. The second antenna element 240 is configured to receive the second transmission signal 241, and, in use, to radiate the second transmission signal 241. Optionally, one or more second signal couplers (not depicted) may be provided for outputting the second transmission signal 241 to the second antenna element 240**.

Optionally, the second tripler 250 depicted in FIG. 2 may comprise a second output (not depicted in FIG. 2), configured to output a leakage component at the first fundamental frequency w1 as a second leakage signal (not depicted in FIG. 2). If the example depicted in FIG. 2 is modified to provide the second leakage signal, the leakage component of the second leakage signal would be at the first fundamental frequency w1 of the first input signal 101. Optionally, one or more second signal couplers (not depicted) may be provided for outputting the second leakage signal to a further transmission signal source (not depicted) with a further tripler (not depicted). This may be advantageous when the antenna device 10 is used in a chain and/or an array.

When being implemented, for example, the first tripler 150 and the second tripler 250 may use the non-linearity of NMOS to generate one or more harmonic components, such as the third harmonic component **3*w*1**. In some examples, one or more gates may be biased through 5 KΩ resistors to improve reliability of one or more transistors. In some examples, the differential structure of one or more common source transformers may be configured to substantially suppress other harmonics, such as a second harmonic component. In some examples, one or more transformers may include a fundamental harmonic trap at the output to increase the suppression of one or more leakage components at a fundamental frequency. This fundamental frequency may be sampled, and used as an input to a next transmission signal source in the chain. In some examples, the bulk of one or more transistors may be arranged to be RF floating to reduce the CDS (drain-source parasitic capacitance). In some examples, one or more frequency splitters may be considered to be a 3-port device comprising 2 filters.

In some examples, one or more antenna elements may be arranged to be matched to 50Ω at the third harmonic frequency **3*w*0**. In this way, the antenna element may act as an inductive choke at the fundamental harmonic.

In some examples, one or more antenna elements may be matched to 50Ω to maximize power delivery by one or more transformers to one or more antenna elements.

In some examples, the third harmonic current may pass through one or more antenna elements that excites the antenna device, in use, to radiate broadside. For example, one or more antenna elements may comprise an on-chip antenna element, arranged to radiate power out of the chip.

In some examples, one or more antenna elements may be configured as an antenna excitation element, arranged to excite at least a portion of a substrate, such as silicon, to radiate power out of a chip. In some examples, one or more antenna elements may be configured as a dielectric resonance antenna (DRA). In some examples, a plurality of antenna elements may be configured as a plurality of antenna excitation elements, arranged to excite at least a portion of the same substrate, such as silicon, to radiate power out of a chip. These may allow more antenna elements to be provided within a predetermined die area to further lower beam widths and/or to further improve beam steering, while increasing radiated power density.

In some examples, one or more antenna elements may include a three-ring (3-ring) antenna element. For example, one or more antenna elements may comprise an on-chip three-ring antenna element, arranged to radiate power out of the chip.

In some examples, one or more three-ring antenna elements may be configured as a three-ring antenna excitation element, arranged to excite at least a portion of a substrate, such as silicon, to radiate power out of a chip. In some examples, one or more three-ring antenna elements may be configured as a dielectric resonance antenna (DRA). In some examples, a plurality of three-ring antenna elements may be configured as a plurality of three-ring antenna excitation elements, arranged to excite at least a portion of the same substrate, such as silicon, to radiate power out of a chip.

In some examples, one or more three-ring antenna elements may be matched to 50Ω to maximize power delivery by one or more transformers to one or more three-ring antenna elements. For example, one or more three-ring antenna elements may be configured to excite a substrate, such as silicon, to radiate power out of a chip. Such a configuration is also called a dielectric resonance antenna (DRA), and may provide flexibility in input impedance matching while keeping effects on antenna gain low.

If a plurality of antenna elements are arranged proximate to each other in a group on a single substrate or a single die, it may be more difficult to generate a narrow beam suitable for beam steering because the signals may combine to a high degree in the die substrate. The degree of combination in the substrate may be reduced by providing the antenna elements on separate substrates and/or by back dicing the substrate. For example, back dicing may be used to provide at least partially separated blocks of 2×2 antenna elements, whereby multiple DRA antennas are created on a single substrate or a single die. Providing at least partially separated blocks may retain a high antenna efficiency of each antenna elements while allowing the entire array to be implemented on, for example, a single CMOS die. Therefore, multiple antenna elements and configuring the antenna elements for combining signals in air may provide a narrower beam and more effective beam steering.

In some examples, the antenna device 10 may comprise one or more additional transformers and an additional frequency splitter for each additional transformer. Each additional transformer may be configured to receive a leakage signal from a preceding frequency splitter as an additional input signal at an additional fundamental frequency. The additional transformer may generate an additional transformer output comprising a harmonic component of the additional fundamental frequency and a leakage component at the additional fundamental frequency.

The additional frequency splitter may comprise an input port and a first output port. The input port may receive the additional transformer output. The first output port may output the additional transmission component of the additional transformer output as an additional transmission signal.

Optionally, the additional frequency splitter may comprise a second output port. The second output port may output the additional leakage component of the additional transformer output as an additional leakage signal. This may be advantageous when such an antenna device is used in a chain and/or an array.

Figure 3B:
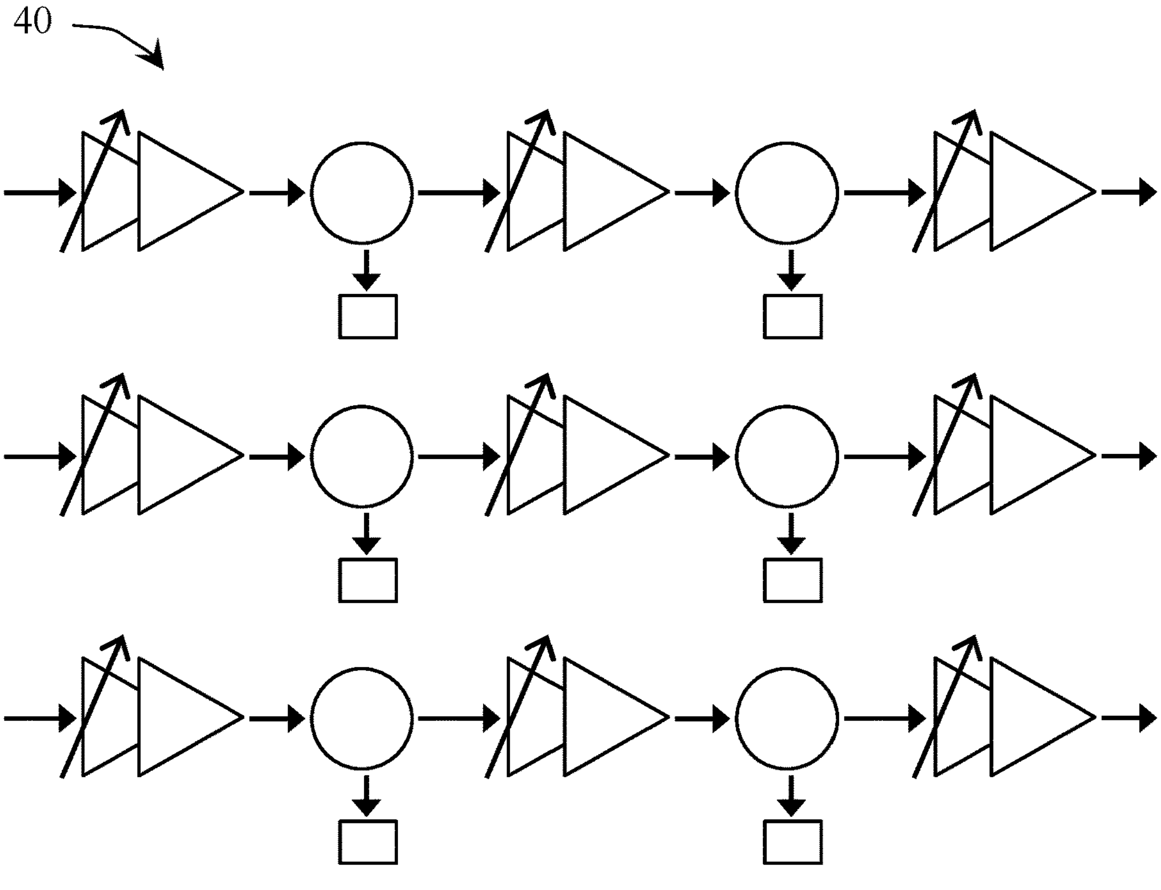
FIG. 3*b* is a schematic diagram showing an antenna device according to an embodiment.

FIG. 3*b* shows a block diagram of an example embodiment suitable for implementing the first antenna device 10 described with respect to FIG. 1. As depicted in the example of FIG. 3*b*, a fourth antenna device 40 (a fourth embodiment of an antenna device) is provided comprising a plurality of the second antenna devices 20 described with respect to FIG. 3*a*, arranged in a 2D-array of antenna elements. In the example depicted in FIG. 3*b*, the fourth antenna device 40 comprises a plurality of the second antenna devices 20 described with respect to FIG. 3*a*, arranged as a plurality of chains or 1D-arrays of antenna elements in a 2D-array In the example depicted in FIG. 3*b*, the fourth antenna device 40 comprises three of the 1D-arrays or chains of antenna elements in a 3×2 or 2×3 array.

Figure 5:
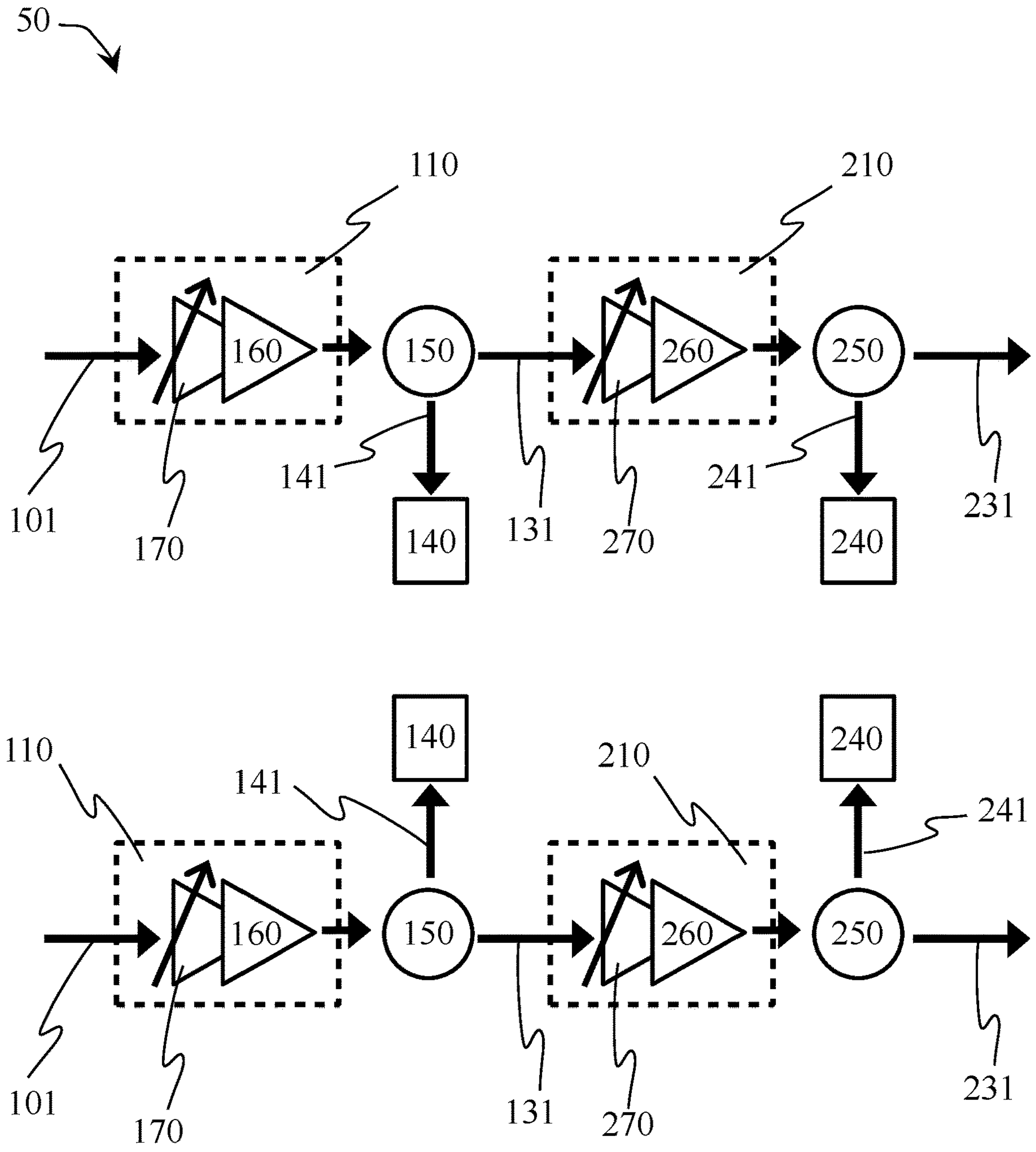
FIG. 5 is a schematic diagram showing an antenna device according to an embodiment.

FIG. 5 shows a block diagram of an example embodiment suitable for implementing the first antenna device 10 described with respect to FIG. 1. As depicted in the example of FIG. 5, a fifth antenna device 50 (a fifth embodiment of an antenna device) is provided comprising a plurality of the second antenna devices 20 described with respect to FIG. 3*a*, arranged in a 2D-array of antenna elements 140, 240. In the example depicted in FIG. 5, the fifth antenna device 50 comprises a plurality of the second antenna devices 20 described with respect to FIG. 3*a*, arranged as a plurality of chains or 1D-arrays of antenna elements 140, 240 in a 2D-array. In the example depicted in FIG. 5, the fifth antenna device 50 comprises two of the 1D-arrays or chains of antenna elements 140, 240 in a 2×2 array. Additionally, the fifth antenna device 50 is arranged to allow the four or more antenna elements 140, 240 to be arranged such that they can be operated as a complete unit. Optionally, the four or more antenna elements 140, 240 may be arranged such that they are proximate to each other. Optionally, the four or more antenna elements 140, 240 may be arranged in rows and/or columns.

Figure 6:
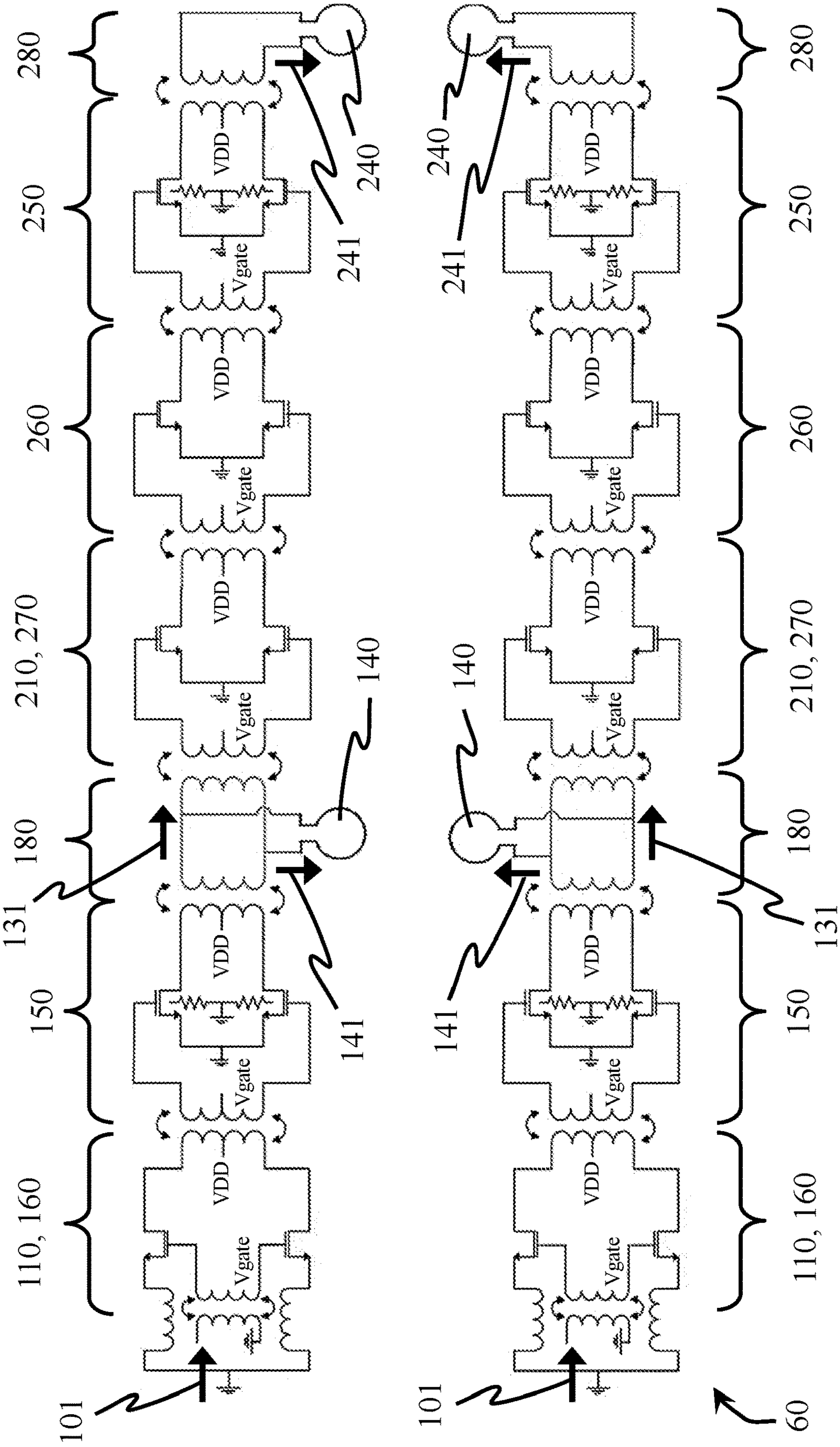
FIG. 6 is a circuit diagram of an antenna device according to an embodiment.

FIG. 6 shows a circuit diagram of an example embodiment suitable for implementing the first antenna device 10 described with respect to FIG. 1. As depicted in the example of FIG. 6, a sixth antenna device 60 (a sixth embodiment of an antenna device) is provided comprising two of the third antenna devices 30 described with respect to FIG. 2, arranged in a 2D-array of antenna elements 140, 240. In the example depicted in FIG. 6, the sixth antenna device 60 comprises two third antenna devices 30 described with respect to FIG. 2, arranged as a two chains or two 1D-arrays of antenna elements 140, 240 in a 2D-array. In the example depicted in FIG. 6, the sixth antenna device 60 comprises two of the 1D-arrays or chains of antenna elements 140, 240 in a 2×2 array. Additionally, the sixth antenna device 60 is arranged to allow the depicted four antenna elements 140, 240 to be arranged such that they can be operated as a complete unit. Optionally, the depicted four antenna elements 140, 240 may be arranged such that they are proximate to each other. Optionally, the depicted four antenna elements 140, 240 may be arranged in rows and/or columns.

It may be advantageous to operate the two branches of the sixth antenna device 60 at similar or the same phases and/or amplitude.

Figure 4:
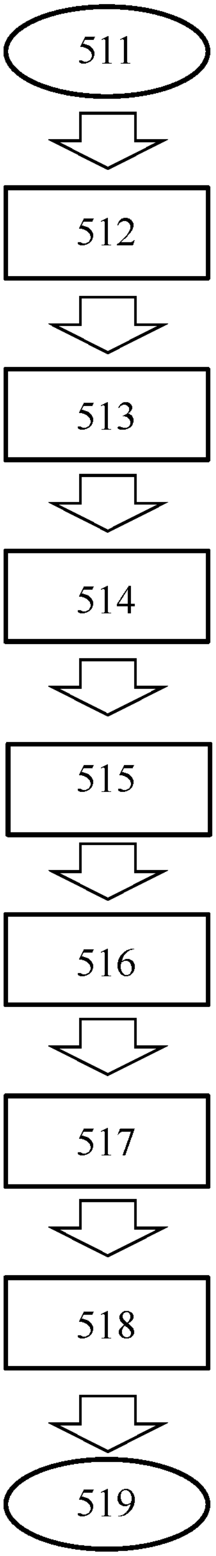
FIG. 4 is a flowchart showing a method of signal transmission according to an embodiment.

The embodiments of an antenna device disclosed herein are suitable for performing methods of signal transmission, including the methods described below. However, the methods disclosed herein may be performed on any suitable configured devices, and any references to antenna devices in this disclosure should be interpreted as examples. FIG. 4 shows an example of a method of signal transmission according to an embodiment. The method of signal transmission 500 depicted starts at step 511 Start.

At step 512 Receive Input Signal, a first input signal 101 is received at a fundamental frequency (w1). For example, the fundamental frequency (w1) of the input signal 101 may be in the range of 75 to 83 GHz.

At step 513 Generate First Transformer Output, a first transformer output 121 is generated. The first transformer output 121 comprises a harmonic component of the fundamental frequency (w1) of the first input signal 101 and a leakage component at the fundamental frequency (w1) of the first input signal 101. In some examples, the harmonic component may be a tripled component at a third harmonic of the fundamental frequency (w1) of the first input signal 101. Alternatively, the harmonic component may be a doubled component or any other harmonic.

At step 514 Output First Transmission Signal, the harmonic component of the first transformer output 121 is output as a first transmission signal 141. During use, the first transmission signal 141 may be radiated from a first antenna element 140 At step 515 Output First Leakage Signal, the leakage component of the first transformer 120 is output as a first leakage signal 131.

At step 516 Generate Second Transformer Output, a second transformer output 221 is generated. The second transformer output 221 is generated based on the first leakage signal 131. The second transformer output 221 comprises a harmonic component of the fundamental frequency (w1) of the first input signal 101 and a leakage component at the fundamental frequency (w1) of the first input signal 101.

At step 517 Output Second Transmission Signal, the harmonic component of the second transformer output 221 is output as a second transmission signal 241. During use, the second transmission signal 241 may be radiated from a second antenna element 240.

At step 518 Radiate Transmission Signals, the first transmission signal 141 and the second transmission signal 240 are radiated, in use, by respective antenna element 140, 240.

The method of signal transmission 500 depicted in FIG. 4 finishes at step 519 Finish.

In this way, a plurality of transmission signals at one or more harmonic frequencies may be radiated, in use, without the use of dividers, thus reducing the DC power consumption of the device. In addition, the DC power consumption of the device may be further reduced by using lower amplifying stages, further improving an efficiency of the chip. In addition, the smaller form factors of the antenna devices described herein, allows antennas to be integrated on a chip, reducing the need for expensive and lossy packaging and interconnects.

In some examples, the transmission signals may be harmonics, i.e. an integer multiple, of the fundamental frequency in the range of 75 to 83 GHZ. For example, each transmission signal may be a third harmonic in the range of 225 to 250 GHz.

Optionally, the method 500 depicted in FIG. 4 may further comprise: receiving, by one or more additional transformers, the leakage signal from a preceding frequency splitter as an additional input signal at an additional fundamental frequency and generating an additional transformer output comprising a harmonic component of the additional fundamental frequency and a leakage component at the additional fundamental frequency; receiving the additional transformer output at an input port of an additional frequency splitter; and outputting the harmonic component of the additional transformer output as an additional transmission signal from a first output port of the additional frequency splitter.

Optionally, the method 500 depicted in FIG. 4 may comprise: outputting the leakage component of the additional transformer output as an additional leakage signal from a second output port of the additional frequency splitter.

Optionally, the method 500 depicted in FIG. 4 may comprise exciting at least a portion of a substrate using one or more antenna elements (140, 240). Additionally or alternatively, the method may comprise resonating at least a portion of a dielectric using one or more antenna elements (140, 240).

Although aspects of the present disclosure herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the scope of the disclosure as defined by the appended claims.

For example, the following may be devices comprising advantageous combinations of features:

a) An antenna device comprising: an input stage configured to receive an input signal at a fundamental frequency; a first transformer configured to receive the input signal and generate a first transformer output comprising a harmonic component of the fundamental frequency and a leakage component at the fundamental frequency: a first frequency splitter comprising: an input port to receive the first transformer output; a first output port to output the harmonic component of the first transformer output as a first transmission signal; and a second output port to output the leakage component of the first transformer output as a first leakage signal; a second transformer configured to receive the first leakage signal and generate a second transformer output comprising a harmonic component of the fundamental frequency and a leakage component at the fundamental frequency: a second frequency splitter comprising: an input port to receive the second transformer output; and a first output port to output the harmonic component of the second transformer output as a second transmission signal; and a plurality of antenna elements each configured to radiate the respective transmission signals.

b) The antenna device a), further comprising: one or more additional transformers each configured to receive the leakage signal from the preceding frequency splitter and generate an additional transformer output comprising a harmonic component of the fundamental frequency and a leakage component at the fundamental frequency; and an additional frequency splitter for each transformer, comprising: an input port to receive the additional transformer output; a first output port to output the harmonic component of the additional transformer output as a first transmission signal; and a second output port to output the leakage component of the additional transformer output as a first leakage signal.

c). The antenna device a) or b), further comprising a respective driving stage for each transformer configured to amplify an input of the transformer.

d). The antenna device c), wherein a gate voltage of each driving stage is controlled to generate a phase adjustment at the input of the transformer.

e). The antenna device a), b), c), or d), wherein each antenna element is a three-ring element.

f). The antenna device a), b), c), d) or e), wherein the harmonic component is a tripled component at a third harmonic of the fundamental frequency.

g). The antenna device f), wherein the fundamental frequency of the input signal is in the range of 75 to 82 GHz, and each transmission signal is in the range of 225 to 250 GHz.

h) An antenna array, comprising a plurality of the antenna device a), b), c), d) e), f) or g).

For example, the following may be methods and processes comprising advantageous combinations of features:

m). A method of signal transmission comprising: receiving, at an input stage, an input signal at a fundamental frequency; generating a first transformer output comprising a harmonic of the fundamental frequency and a leakage component at the fundamental frequency: receiving the first transformer output at an input port of a first frequency splitter; outputting the harmonic of the first transformer output as a first transmission signal from a first output port of the first frequency splitter; outputting the leakage component of the first transformer output as a first leakage signal from a second output port of the first frequency splitter; generating a second transformer output comprising a harmonic component of the fundamental frequency and a leakage component at the fundamental frequency; receiving the second transformer output at an input port of a second frequency splitter; outputting the harmonic of the second transformer output as a second transmission signal from a first output port of the second frequency splitter; and radiating each of the transmission signals from a respective plurality of antenna elements.

n). The method of m), further comprising: receiving, by one or more additional transformers, the leakage signal from the preceding frequency splitter and generating an additional transformer output comprising a harmonic component of the fundamental frequency and a leakage component at the fundamental frequency; receiving the additional transformer output at an input port of an additional frequency splitter; outputting the harmonic component of the additional transformer output as an additional transmission signal from a first output port of the additional frequency splitter; outputting the leakage component of the additional transformer output as an additional leakage signal from a second output port of the additional frequency splitter.

o). The method of m) or n), further comprising amplifying an input of each transformer at a respective driving stage for the transformer.

p). The method of o), further comprising controlling a gate voltage of each driving stage to generate a phase adjustment at the input of the transformer.

q). The method of any one of m), n), o), or p), wherein each antenna element is a three-ring element.

r). The method of any one of m), n), o), p) or q), wherein the harmonic component is a tripled component at a third harmonic of the fundamental frequency.

s). The method of r), wherein the fundamental frequency of the input signal is in the range of 75 to 82 GHz, and each transmission signal is in the range of 225 to 250 GHz.

For example, advantageous aspects of this disclosure may be summarized as an antenna device which comprises an input stage to receive an input signal at a fundamental frequency, a first transformer to receive the input signal and generate a first transformer output with a harmonic component of the fundamental frequency and a leakage component at the fundamental frequency, a first frequency splitter having an input port to receive the first transformer output, a first output port to output the harmonic component of the first transformer output as a first transmission signal, and a second output port to output the leakage component of the first transformer output as a first leakage signal, a second transformer to receive the first leakage signal and generate a second transformer output with a harmonic component of the fundamental frequency and a leakage component at the fundamental frequency, a second frequency splitter having an input port to receive the second transformer output and a first output port to output the harmonic component of the second transformer output as a second transmission signal, and a plurality of antenna elements to radiate the respective transmission signals.

For example, an antenna device 10 comprises a first transformer to output a harmonic component of a fundamental frequency and a leakage component at the fundamental frequency, a first frequency splitter 130 outputting the harmonic component as a first transmission signal and outputting a first leakage signal, a first antenna element configured to radiate the first transmission signal; a second transformer 220 to receive the first leakage signal and output a harmonic component of the fundamental frequency, a second frequency splitter 230 outputting the harmonic component as a second transmission signal, and a second antenna element 240 configured to radiate the second transmission signal. A plurality of transmission signals at harmonic frequencies may be radiated without the use of dividers, thus reducing a DC power consumption of antenna devices. This may increase a total radiated poser for an array area without requiring lenses.

For example, advantageous embodiments may be implemented using aspects of this disclosure such as those described in "A coherent 233-243 GHz scalable 1D array in 28 nm bulk CMOS using sub-harmonic inter-element leakage," Sumeet Londhe and Eran Socher, doi: 10.1109/IMS37962.2022.9865643, which is incorporated herein by reference. For example, a single-element on-chip sub-THz coherent source may be extended to a 1D array without the use of lossy power dividers. A leaked fundamental signal from a harmonic generating circuit may be used as an input to the next element in a chain. To demonstrate this concept a 233-243 GHz 1×2 radiating transmitter (Tx) is presented in TSMC 28 nm bulk CMOS. A single Tx consists of 75-84 GHz PA (power amplifier) and a driving stage followed by 75-84 GHz to 225-252 GHz tripler. The leaked signal from the first element is amplified and drives a second tripler element. Biasing control is used to phase shift the signal between elements in the fundamental, thus tripling that phase difference at the radiated output. The outputs of each tripler are connected to on-chip ring antennas that excite the silicon die itself. The lens-less radiating Tx array has a directivity of 7.5 dBi with 52% efficiency and 10 GHz bandwidth, a measured peak EIRP of 10 dBm, 3 dBm total radiated power, a DC-to-RF efficiency of 0.8% and demonstrated beam steering. For example, the driving stage transistors were sized to 15 fingers and gate width of 600 nm. The output stage transistors were sized to 20 fingers and gate width of 600 nm each.

For example, advantageous embodiments may be implemented using aspects of this disclosure to scale coherent single sources/1D arrays into 2D arrays without the use of lossy power divider signal distribution. A leaked fundamental from a non-linear harmonic generator circuit is used as an input to drive the next element in a chain. A 232-243 GHz radiating 2×2 array is designed in 28 nm CMOS to demonstrate this method. A single transmitter (Tx) element consists of a 75-83 GHz driving stage, 75-83 GHz PA (power amplifier) followed by a frequency tripler to 225-240 GHz. The fundamental 75-83 GHz signal leaked from the frequency tripler is coupled using a balun and used to drive the next Tx element. The third harmonic current from the frequency tripler is coupled using the balun and delivered to the antenna element which is matched to third harmonic. The antenna elements excite the silicon die itself which radiates as a dielectric resonance antenna (DRA). Biasing control is used to tune the phase at the fundamental harmonic thus tripling phase shift at the third harmonic between antenna elements. The lens-less radiating array achieves a measured directivity of 9.5 dBi with 60% efficiency. The 2×2 Tx array achieves a peak EIRP of 18 dBm with peak radiated power of 8 dBm at 1.2% RF/DC efficiency and demonstrated 2D beam steering. For example, the driving stage transistors were chosen as 15 fingers of 600 nm width. The output stage transistors were sized to 20×600 nm each.

REFERENCE NUMBERS USED IN DRAWINGS

10 First antenna device
20 Second antenna device
30 Third antenna device
40 Fourth antenna device
50 Fifth antenna device
60 Sixth antenna device
100 First transmission signal source
101 First input signal
110 First input stage
120 First transformer
121 First transformer output
130 First frequency splitter
131 First leakage signal
140 First antenna element
141 First transmission signal
150 First tripler
160 First driving stage
170 First phase adjustment
180 First signal coupler
200 Second transmission signal source
201 Second input signal
210 Second input stage
220 Second transformer
221 Second transformer output
230 Second frequency splitter
231 Second leakage signal
240 Second antenna element
241 Second transmission signal
250 Second tripler
260 Second driving stage 260
270 Second phase adjustment
280 Second signal coupler
500 Method of signal transmission
511 Start
512 Receive input signal
513 Generate first transformer output
514 Output first transmission signal
515 Output first leakage signal
516 Generate second transformer output
517 Output second transmission signal
518 Radiate transmission signals
519 Finish

The invention claimed is:

1. An antenna device comprising:

a first transformer configured to receive a first input signal at a fundamental frequency and to generate a first transformer output comprising a first harmonic component of the fundamental frequency and a first leakage component at the fundamental frequency;

a first frequency splitter comprising a first input port to receive the first transformer output, a first output port to output the first harmonic component as a first transmission signal, and a second output port to output the first leakage component as a first leakage signal;

a first antenna element configured to radiate, in use, the first transmission signal;

a second transformer configured to receive the first leakage signal and to generate a second transformer output comprising a second harmonic component of the fundamental frequency and a second leakage component at the fundamental frequency;

a second frequency splitter comprising a second input port to receive the second transformer output, and a third output port to output the second harmonic component as a second transmission signal; and a second antenna element configured to radiate, in use, the second transmission signal.

2. The antenna device of claim 1, wherein:

the second frequency splitter comprises a fourth output port to output the second leakage component as a second output leakage signal.

3. The antenna device of claim 1, further comprising:

one or more additional transformers each configured to receive, from a preceding frequency splitter, a corresponding leakage signal as an additional input signal at an additional fundamental frequency and to generate an additional transformer output comprising a further harmonic component of the additional fundamental frequency and a further leakage component at the additional fundamental frequency; and an additional frequency splitter for each additional transformer, comprising a further input port to receive the additional transformer output and a first further output port to output the further harmonic component as an additional transmission signal, wherein the additional frequency splitter for each additional transformer comprises a second further output port to output the further leakage component as an output leakage signal for a subsequent transformer.

4. The antenna device claim 1, further comprising a respective driving stage for one or more transformers, the respective driving stage configured to amplify an input of the one or more transformers, wherein a gate voltage of the respective driving stage is controlled to generate a phase adjustment at an input of the one or more transformers.

5. The antenna device of claim 1, wherein one or more antenna elements comprises a three-ring antenna element.

6. The antenna device of claim 1, wherein one or more harmonic components comprises a doubled component at a second harmonic of the fundamental frequency.

7. The antenna device of claim 1, wherein one or more harmonic components comprises a tripled component at a third harmonic of the fundamental frequency, wherein the fundamental frequency of the first input signal is in a range of 75 to 83 GHZ, and wherein each of the first transmission signal and the second transmission signal is in a range of 225 to 250 GHz.

8. The antenna device of claim 1, further comprising a first input stage configured to receive the first input signal at the fundamental frequency, and a second input stage configured to receive the first leakage signal.

9. The antenna device of claim 1, wherein a plurality of antenna elements are arranged in a chain, in an array, as one or more on-chip antenna elements, and/or as one or more dielectric resonance antennas (DRA).

10. The antenna device of claim 1, wherein one or more antenna elements are arranged to excite at least a portion of a substrate.

11. An antenna array and/or antenna chain, comprising a plurality of the antenna devices of claim 1.

12. A method of signal transmission, the method comprising:

receiving a first input signal at a fundamental frequency;

generating a first transformer output comprising a first harmonic component of the fundamental frequency and a first leakage component at the fundamental frequency;

receiving the first transformer output at an input port of a first frequency splitter;

outputting the first harmonic component of the fundamental frequency as a first transmission signal from a first output port of the first frequency splitter;

outputting the first leakage component of the fundamental frequency as a first leakage signal from a second output port of the first frequency splitter;

generating a second transformer output comprising a second harmonic component of the fundamental frequency and a second leakage component at the fundamental frequency;

receiving the second transformer output at an input port of a second frequency splitter;

outputting the second harmonic component of the fundamental frequency as a second transmission signal from a first output port of the second frequency splitter; and radiating each of the first transmission signal and the second transmission signal from a respective antenna element.

13. The method of claim 12, further comprising:

receiving, by one or more additional transformers, a leakage signal from a preceding frequency splitter as an additional input signal at an additional fundamental frequency;

generating an additional transformer output comprising a harmonic component of the additional fundamental frequency and a leakage component at the additional fundamental frequency;

receiving the additional transformer output at an input port of an additional frequency splitter; and outputting the harmonic component of the additional fundamental frequency as an additional transmission signal from a first output port of the additional frequency splitter.

14. The method of claim 13, further comprising:

outputting the leakage component of the additional transformer output as an additional leakage signal from a second output port of the additional frequency splitter.

15. The method of claim 12, further comprising:

amplifying an input of one or more transformers at a respective driving stage for the one or more transformers; and controlling a gate voltage of the respective driving stage to generate a phase adjustment at an input of the one or more transformers.

16. The method of claim 12, wherein the respective antenna element comprises a three-ring antenna element.

17. The method of claim 12, wherein one or more harmonic components comprises a doubled component at a second harmonic of the fundamental frequency.

18. The method of claim 12, wherein one or more harmonic components comprises a tripled component at a third harmonic of the fundamental frequency, wherein the fundamental frequency of the first input signal is in a range of 75 to 83 GHZ, and wherein each of the first transmission signal and the second transmission signal is in a range of 225 to 250 GHz.

19. The method of claim 12, further comprising:

exciting at least a portion of a substrate using the respective antenna element.

20. The method of claim 12, further comprising:

resonating at least a portion of a dielectric using the respective antenna element.

* * * * *